(12) United States Patent
Boyd et al.

(10) Patent No.: US 6,379,016 B1
(45) Date of Patent: Apr. 30, 2002

(54) LIGHT GUIDE WITH EXTRACTION STRUCTURES

(75) Inventors: Gary T. Boyd, Woodbury; Richard Miller, Stillwater; Leland R. Whitney; Kenneth A. Epstein, both of St. Paul, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/669,932

(22) Filed: Sep. 26, 2000

Related U.S. Application Data (63) Continuation-in-part of application No. 09/505,312, filed on Feb. 16, 2000.

(51) Int. Cl.$^7$ ................................................ F21V 7/04
(52) U.S. Cl. .................... 362/31; 362/330; 362/331; 362/348; 362/561; 349/63; 349/65; 385/901
(58) Field of Search .................... 362/31, 330, 331, 362/326, 343, 348; 349/63, 65; 385/901

(56) References Cited

U.S. PATENT DOCUMENTS

| | | | |
|---|---|---|---|
| 1,739,954 A | 12/1929 | Du Pont | 362/23 |
| 2,358,203 A | 9/1944 | Best | 362/31 |
| 4,004,546 A | 1/1977 | Harland | 116/288 |
| 4,373,282 A | 2/1983 | Wragg | 40/546 |
| 4,528,617 A | 7/1985 | Blackington | 362/558 |
| 4,751,615 A | 6/1988 | Abrams | 362/31 |
| 4,799,137 A | 1/1989 | Aho | 362/309 |
| 4,811,507 A | 3/1989 | Blanchet | 362/31 |
| 4,874,228 A | 10/1989 | Aho et al. | 349/62 |
| 5,005,108 A | 4/1991 | Pristash et al. | 362/31 |
| 5,050,946 A | 9/1991 | Hathaway et al. | 385/33 |
| 5,054,885 A | 10/1991 | Melby | 359/618 |
| 5,163,748 A | 11/1992 | Messinger | 362/98 |
| 5,190,370 A | 3/1993 | Miller et al. | 362/340 |
| 5,341,231 A | 8/1994 | Yamamoto et al. | 349/63 |
| 5,359,691 A | 10/1994 | Tai et al. | 385/146 |
| 5,396,350 A | 3/1995 | Beeson et al. | 349/62 |
| 5,428,468 A | 6/1995 | Zimmerman et al. | 362/31 |
| 5,485,354 A | 1/1996 | Ciupke et al. | 362/31 |
| 5,506,929 A | 4/1996 | Tai et al. | 385/146 |
| 5,555,109 A | 9/1996 | Zimmerman et al. | 362/31 |
| 5,555,329 A | 9/1996 | Kuper et al. | 385/36 |
| 5,594,830 A | 1/1997 | Winston et al. | 385/146 |
| 5,608,550 A | 3/1997 | Epstein et al. | 349/57 |
| 5,608,837 A | 3/1997 | Tai et al. | 385/146 |
| 5,613,751 A | 3/1997 | Parker et al. | 362/31 |
| 5,668,913 A | 9/1997 | Tai et al. | 385/146 |
| 5,671,994 A | 9/1997 | Tai et al. | 362/31 |
| 5,835,661 A | 11/1998 | Tai et al. | 385/146 |
| 5,894,539 A | 4/1999 | Epstein | 385/133 |
| 6,088,074 A | * 7/2000 | Suzuki | 349/62 |

FOREIGN PATENT DOCUMENTS

| | | |
|---|---|---|
| EP | 0 802 446 A1 | 10/1997 |
| EP | 0 940 706 A1 | 8/1999 |

\* cited by examiner

*Primary Examiner*—Sandra O'Shea
*Assistant Examiner*—Ali Alavi
(74) *Attorney, Agent, or Firm*—Stephen W. Buckingham; David R. Cleveland

(57) ABSTRACT

A light distribution device having a light-redirecting surface with a plurality of light extraction structures having a riser segment, plateau segment, and facet segment, with adjacent light extraction structures being separated by lands. The light extraction structures improve extraction efficiency, thereby facilitating use of available light from a light source.

36 Claims, 11 Drawing Sheets

LIGHT GUIDE WITH EXTRACTION STRUCTURES

This application is a continuation-in-part of appln. Ser. No. 09/505,312 filed Feb. 16, 2000.

TECHNICAL FIELD

This invention relates to electronic displays, and to point to line, line to area or point to area converters for illuminating displays.

BACKGROUND ART

A variety of devices have been proposed for illuminating electronic displays. These devices include backlighting panels, front lighting panels, concentrators, reflectors, structured-surface films and other optical devices for redirecting, collimating, distributing or otherwise manipulating light. Efficient use of the light is particularly important in battery powered electronic displays such as those used in cell phones, personal digital assistants and laptop computers.

U.S. Pat. No. 4,751,615 (Abrams) shows a tapering wedge transparent page lighting device. U.S. Pat. No. 4,811,507 (Blanchet) shows a front light illuminating panel having light-emitting striations whose depth increases with distance from the light source. U.S. Pat. Nos. 5,005,108 (Pristash et al.); 5,050,946 (Hathaway et al.) and 5,594,830 (Winston et al.) show structured-surface panel illuminators whose panel depth varies along the length of the panel. U.S. Pat. Nos. 4,799,137 (Aho); 4,874,228 (Aho et al.); 5,054,885 (Melby); and 5,190,370 (Miller et al.) show various light fixtures having inclined or curved prismatic structured surface films.

U.S. Pat. Nos. 5,359,691 and 5,608,837 (both to Tai et al.); U.S. Pat. No. 5,485,354 (Ciupke et al.); and U.S. Pat. Nos. 5,608,550 and 5,894,539 (both to Epstein et al.) show structured-surface backlighting or front lighting devices having triangular microprisms or microgrooves separated by flat land areas or lands. European Patent Application EP 0 802 446 A1 (Seiko Epson) shows a structured-surface backlighting device having rectangular projections separated by lands. U.S. Pat. No. 5,671,994 (Tai et al) shows a structured-surface front lighting device having trapezoidal projections separated by lands.

U.S. Pat. No. 5,396,350 (Beeson et al.); U.S. Pat. Nos. 5,428,468 and 5,555,109 (both to Zimmerman et al.) and U.S. Pat. No. 5,555,329 (Kuper et al.) show various structured-surface backlighting devices having an array of microprisms with tilted sidewalls.

U.S. Pat. Nos. 5,506,929, 5,668,913 and 5,835,661 (all to Tai et al.) and U.S. Pat. No. 5,613,751 (Parker et al.) show light-expanding systems for converting a point light source into a linear or planar light beam.

SUMMARY OF THE INVENTION

Although a number of backlight and front light guide devices have been proposed, there is an ongoing need for more efficient designs and for reduced power consumption.

Many current designs do not use all of the light supplied by the light source. If such unused light could be channeled to the display, then power consumption could be further reduced and display brightness could be increased.

Several of the above-mentioned designs have a more or less constant thickness and a generally flat structured surface. These designs may fail to extract light that travels to the end of the device without striking (and thereby being reflected from or extracted by) the structured surface.

A wedge-shaped design can reduce the amount of (and thus the loss of) light that travels the length of the device without being reflected or extracted. However, some current wedge designs are difficult to manufacture. For example if the device tapers to a thin edge at its distal end, the edge can be difficult to mold and may fracture or craze in use. If instead a mirrored surface is employed at the distal end, some light will be lost due to inefficient reflection at the mirror, and other light will be lost due to reduced efficiency of extraction for reflected light returning towards the input end of the device. Addition of a mirror can also increase manufacturing costs or lower manufacturing yields.

The efficiency and evenness of light extraction by wedge-shaped backlight or front light guide devices generally is governed in part by the gross overall dimensions and shape of the wedge, and by the fine-featured (usually microscopic) dimensions and shapes of any structured-surface features on the device. For example, the design shown in the above-mentioned Hathaway et al. patent has an inclined structured-surface face in the form of a series of descending steps. Each step has a flat land area and an inclined facet. Light typically is extracted from such a device at the facets. Light typically is redistributed within such a device by total internal reflection or "TIR" of light striking the lands or by TIR of light striking an opposing surface of the device. The reflected light travels toward the narrow or distal end of the device and may eventually emerge from the device by extraction at a facet. However, some of the reflected light will be lost at the distal end of the device and thus is not available for display illumination.

Several of the other constant thickness or wedge-shaped backlight or light guide devices mentioned above can also be regarded as having facets and lands, although other terms may have been used to describe the parts of these devices. In general, the overall shape of the backlight or light guide and the geometry of the structured surface will affect the ratio of extracted light to reflected light for these devices as well.

We have found that by using a wedge design having a structured surface that includes risers which serve to increase the portion of the facet area available for light extraction, we can obtain improvements in uniformity of illumination, control over light extraction, efficiency, or in more than one or even all of these factors. The present invention provides, in one aspect, a light extraction device having:

a) a light input end;
b) a generally planar light output surface that can deliver light to a display; and
c) a structured light-redirecting surface located generally opposite the light output surface;

wherein the light output surface and light-redirecting surface define a generally wedge-shaped profile that decreases in thickness from the light input end towards the center of the device; the light-redirecting surface reflects light towards the light output surface and thence to the display; and the light-redirecting surface comprises a plurality of projections comprising a riser segment, plateau segment, and facet segment, with land segments flanking the projections.

Without risers, the amount of extracted light will be determined by the orientation and size of the facets and lands. When risers are added to the design, the size of each facet (and thus the facet area available for extraction) is in effect increased. The overall wedge-shaped extractor profile permits all or a significant portion of the total facet area to participate in extraction. Thus, inclusion of a riser and use of an overall wedge shape enables alteration of the extractor design to increase light extraction to a display. This can enable improvements in the overall size and efficiency of the device and can make better use of the available light.

In another embodiment, the plateaus of the extraction structures of the light guides have greater area than the lands separating them. Alternatively stated, a majority of the extraction structures have plateaus that are larger than the adjacent lands.

In a still further embodiment, at least some of the extraction structures have protrusions where the protrusions have at least riser segments and facet segments.

The present invention also provides point to line converters, backlights and front light guides comprising the above-described wedge-shaped light extraction device, and displays containing such extraction devices.

DETAILED DESCRIPTION

The wedge-shaped light extraction devices of the invention provide point to line, line to area or point to area light conversion that collimates or redirects light from a light source. The extraction device (which for brevity will sometimes be referred to as the extractor) can be used to illuminate a display. If the light source is a point light source, then typically the source has a relatively small cross-sectional area compared to the cross-sectional area of the display (e.g., on the order of less than 1/100 of the area of the display). If the light source is an elongated (e.g., a line) light source, then typically the source has a rectangular cross-sectional area whose long dimension is approximately ten or more times its short dimension, and which may approximate a short or long dimension of the face of the display.

Some of the extractor's components and their relationship to one another can conveniently be described by comparison to a reference plane. Usually the light output surface of the extractor is planar or nearly planar. For purposes of this invention, the reference plane will be taken to be the plane formed by (or closely approximating) the light output surface of the extractor.

Figure 1A:
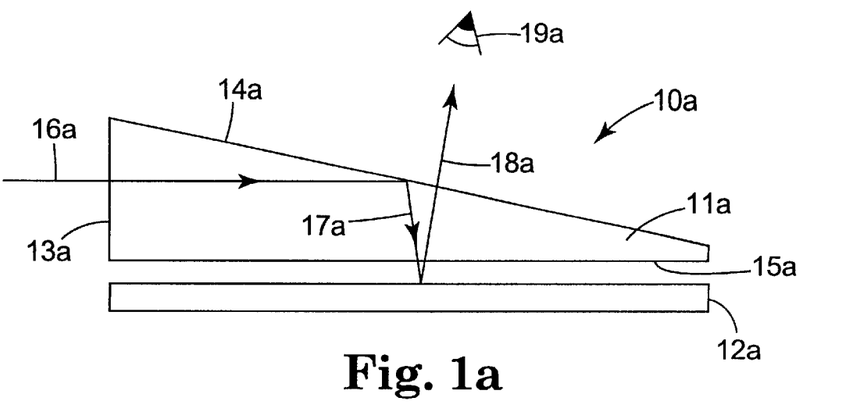
FIG. 1a is a schematic view of a front light guide.

Referring now to FIG. 1a, a front light guide and display generally identified as 10a is shown in schematic form. Front light guide 11c lies above display 12a. Light ray 16a enters light guide 11a through light input surface 13a. Light ray 16a strikes light-redirecting surface 14a on a light-reflecting facet segment (not shown), passes downward as reflected light ray 17a towards display 12a, and exits light guide 11a through light output surface 15a. Upon striking display 12a (and assuming that display 12a is suitably modulated to reflect light), light ray 17a is reflected upward as light ray 18a towards viewer 19a. Light ray 18a passes through surface 15a (which, although identified as a light output surface, also serves in this front light guide design as a surface through which reflected light ray 18a can reenter the light guide), passes through light guide 11a and exits through light-redirecting surface 14a at a land, facet or plateau segment (not shown).

Figure 1B:
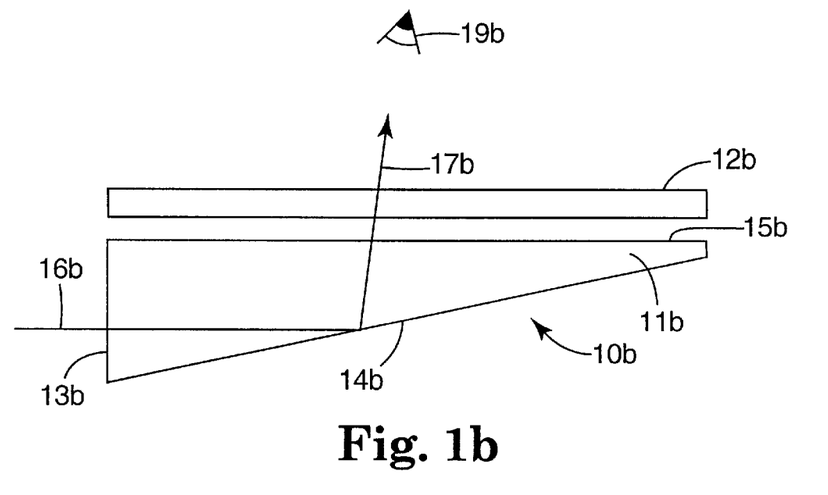
FIG. 1b is a schematic view of a backlight.

Referring to FIG. 1b, a backlight and display generally identified as 10a is shown in schematic form. Front light guide 11b lies below display 12b. Light ray 16b enters backlight 11b through light input surface 13b. Upon striking light-redirecting surface 14b at a facet segment (not shown), light ray 16b is reflected upwards as light ray 17b. Light ray 17b exits backlight 11b through light output surface 15b and (assuming that display 12a is suitably modulated to transmit light) passes through display 12b towards viewer 19b.

Figure 2:
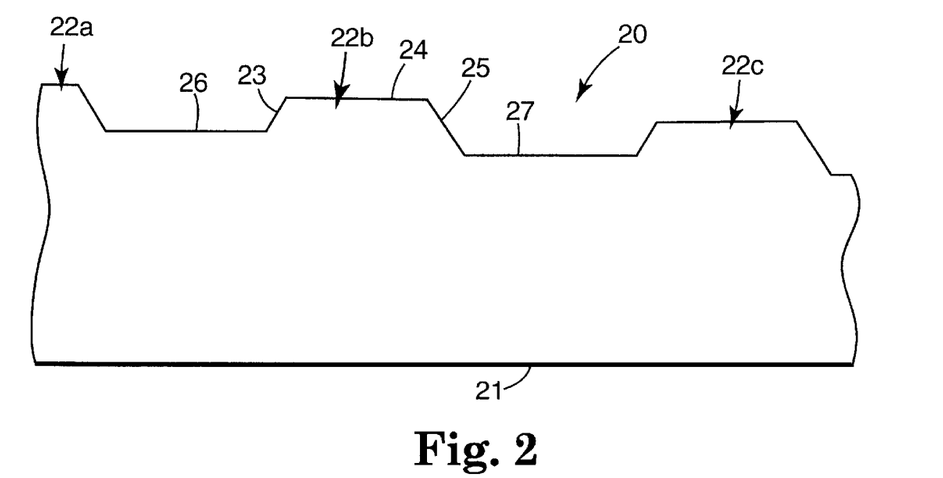
FIG. 2 is a magnified cross-sectional side view of a light extraction device of the invention.

Referring to FIG. 2, front light guide 20 of the invention has a generally wedge-shaped cross section that diminishes in thickness from left to right in the figure. Light output surface 21 is located generally opposite a light-redirecting surface having a plurality of projections 22a, 22b and 22c and intervening lands such as lands 26 and 27. Projection 22b has riser 23 adjoining plateau 24, which in turn adjoins facet 25. Lands 26 and 27 flank projection 22b. For purposes of discussion, projections such as projection 22b can be referred to as "generally trapezoidal", even though the projection has only three sides and even though a quadrilateral formed by drawing an imaginary line to complete the fourth side of the projection might not have two parallel sides.

Figure 3:
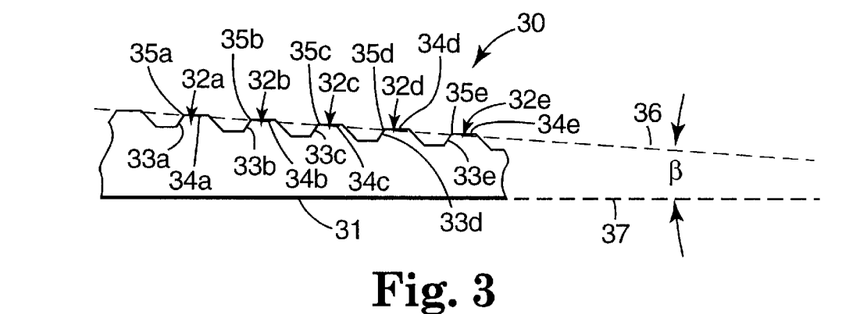
FIG. 3 is a magnified cross-sectional side view of a light extraction device of the invention, showing descriptive angle β.

FIG. 3 shows front light guide 30 of the invention and an imaginary line 36 constructed by drawing a line through vertices 35a through 35e formed at the respective intersections of risers 33a through 33e with plateaus 34a through 34e of projections 32a through 32e. Imaginary line 36 forms an angle β (beta) with a line 37 drawn through the plane formed by generally planar light output surface 31.

Figure 4:
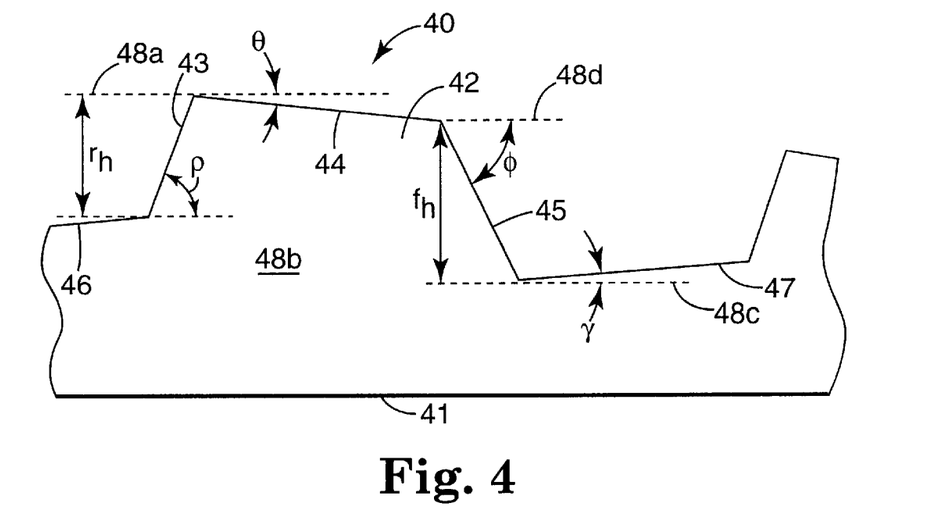
FIG. 4 is a magnified cross-sectional side view of a light extraction device of the invention, showing descriptive angles ρ, θ, φ, and γ and descriptive heights $r_h$ and $f_h$.

Referring to FIG. 4, front light guide 40 of the invention has light output surface 41 and projection 42. Again for purposes of discussion, projection 42 can be referred to as "generally trapezoidal", even though it has only three sides and even though a quadrilateral formed by drawing an imaginary line to complete the fourth side of projection 42 might not have two parallel sides. Imaginary lines 48a and 48b are drawn parallel to light output surface 41 through the respective upper and lower vertices of riser 43. Riser 43 has height $r_h$, and forms angle ρ (rho) with imaginary line 48b (and, if projected, with surface 41). Plateau 44 slopes downward toward light output surface 41, forming angle θ (theta) with imaginary line 48a (and, if projected, with surface 41). Facet 45 has height $f_h$ measured between imaginary lines 48c and 48d which are drawn parallel to surface 41 through the respective lower and upper vertices of facet 45. Facet 45 slopes downward toward light output surface 41, forming angle φ (phi) with imaginary line 48d (and, if projected, with surface 41). Lands 46 and 47 flank projection 42. Land 47 slopes upward away from light output surface 41, forming angle γ (gamma) with imaginary line 48c (and, if projected, with surface 41).

Figure 5:
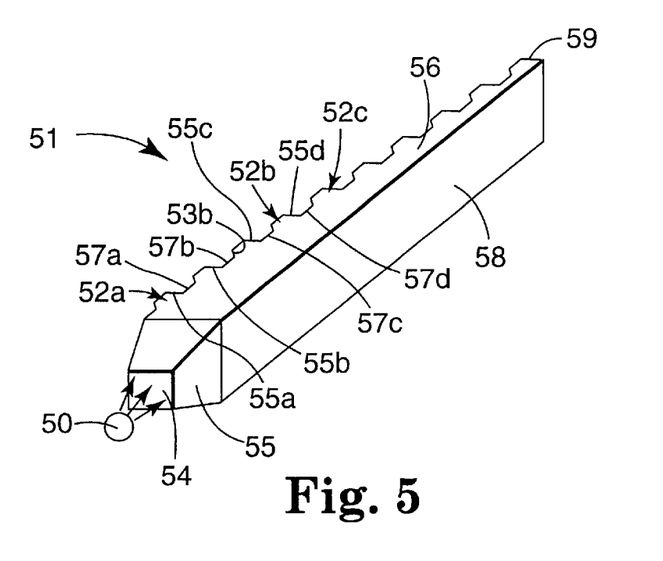
FIG. 5 is a perspective view of another light extraction device of the invention.

FIG. 5 shows a point to line converter 51 of the invention incorporating a wedge-shaped extractor. For purposes of illustration, surface structures such as projections 52a, 52b and 52c are shown in exaggerated scale. Preferably such projections would be much smaller as described in more detail below. Light rays emitted from point light source 50 enter light input surface 54 of beam collector 55 and travel down the length of light pipe 56. Light rays striking facets such as 55a, 55b, 55c and 55d will be extracted by TIR through light output surface 58. Light striking lands such as 57a, 57b, 57c and 57d will be reflected by TIR within light pipe 56 towards surface 58 and distal end 59 of point to line converter 56. Upon striking surface 58, these latter light rays will be further reflected by TIR from surface 58 towards other projections (not labeled) in light pipe 56. Substantially all the light rays will eventually exit light pipe 56 through generally planar light output surface 58 and will form a generally evenly distributed rectangular light beam.

Figure 6:
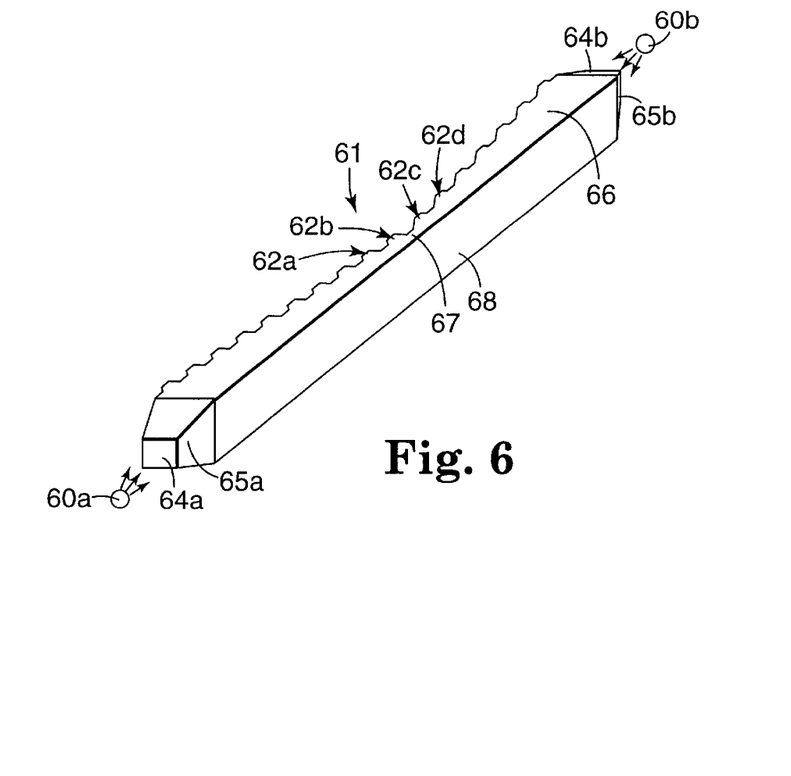
FIG. 6 is a perspective view of yet another light extraction device of the invention.

FIG. 6 shows a point to line converter 61 of the invention having two light sources 60a and 60b. As with the converter of FIG. 5, the projections in the converter of FIG. 6 are shown in exaggerated scale. Light rays from light sources 60a and 60b enter input surfaces 64a and 64b of beam collectors 65a and 65b and travel down light pipe 66. The thickness of light pipe 66 decreases along the length of the device, reaching a minimum at narrow portion 67. Light is extracted or reflected from projections such as 62a through 62d, eventually exiting light pipe 66 through light output surface 68 as a generally evenly distributed rectangular light beam.

Figure 7:
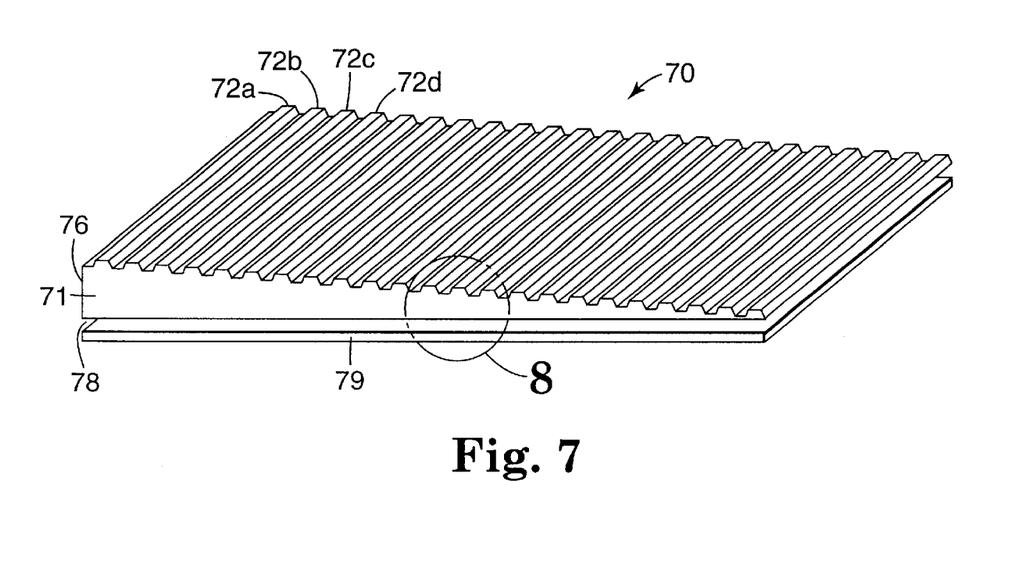
FIG. 7 is a perspective view of a further light extraction device of the invention.

FIG. 7 shows a front light guide and display assembly 70 of the invention. Light guide 71 lies atop display 79, separated slightly by optional air gap 78. Light enters light guide 71 through light input surface 76 and travels along the guide to strike facets on projections such as 72a through 72d.

Figure 8:
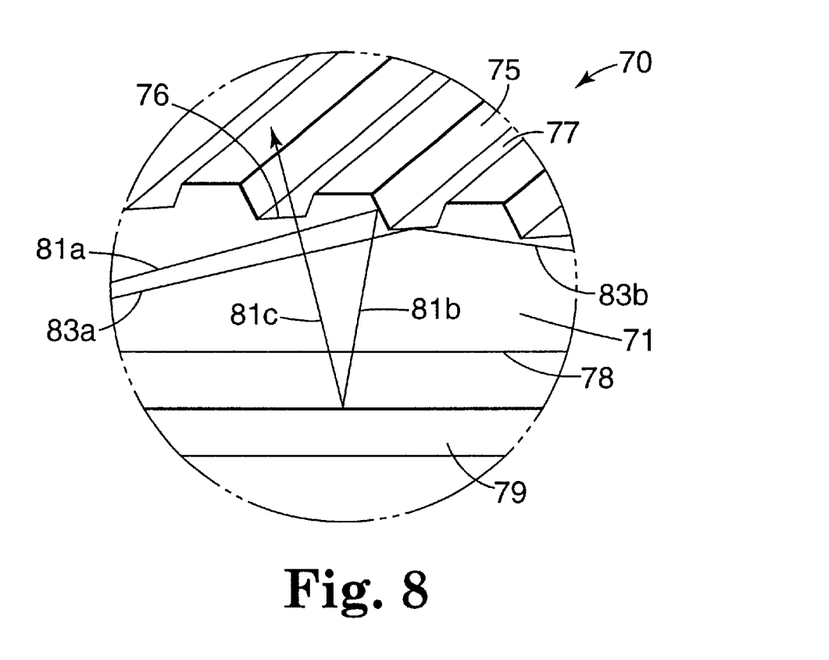
FIG. 8 is a magnified view of the device of FIG. 7, showing the paths taken by two light rays.

FIG. 8 shows a magnified view of a portion of the front light guide 71 of FIG. 7. Light ray 81a strikes facet 75 and is reflected downward as light ray 81b through output surface 78 towards display 79. Upon striking display 79 (and assuming that display 79 is suitably modulated), light ray 81b will be reflected upwards as light ray 81c, reentering light guide 71 through surface 78 and then exiting light guide 71 through land 76. Light ray 83a, which approaches the structured surface of light guide 71 along a different path than light ray 81a, strikes land 77 and is reflected as light ray 83b towards surface 78 and distal end (not shown) of light guide 71. Owing to the slight upward tilt of land 77, ray 83a will strike land 77 (and reflected ray 83b will strike surface 78) at a higher angle of incidence than would be the case if land 77 were parallel to surface 78. For the same reason, reflected ray 83b will strike surface 78 at a point located closer to the distal end of light guide 71 than would be the case if land 77 were parallel to surface 78. This aids in the improved efficiency of extraction of light from light guide 71, by increasing the angle of incidence for light eventually reaching the facets.

Figure 9:
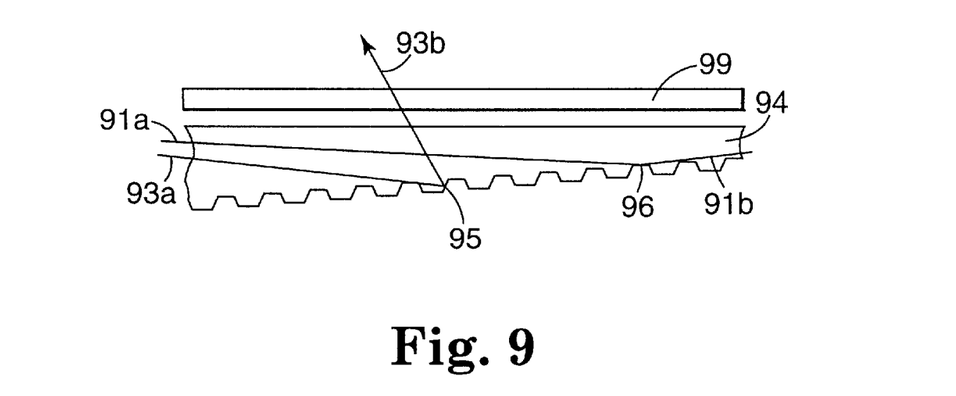
FIG. 9 is a cross-sectional view of an additional light extraction device of the invention.
Figure 10A:
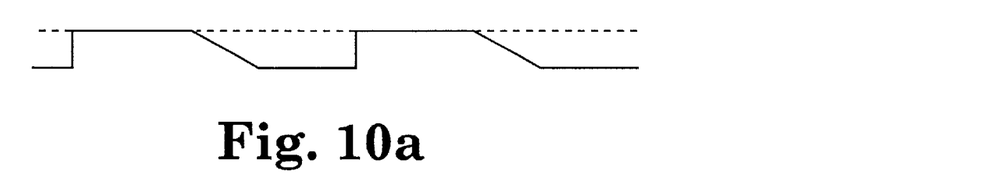
FIG. 10 shows the shapes of the extractors used in the examples.
Figure 10B:
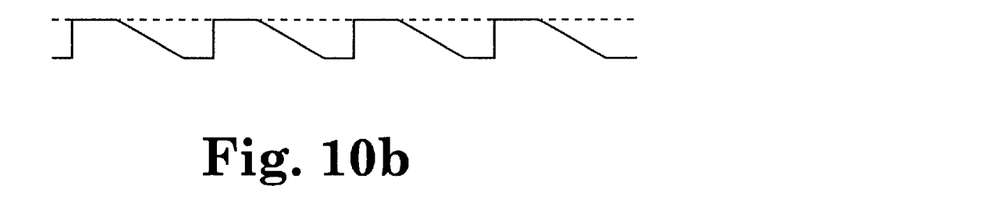
Figure 10C:
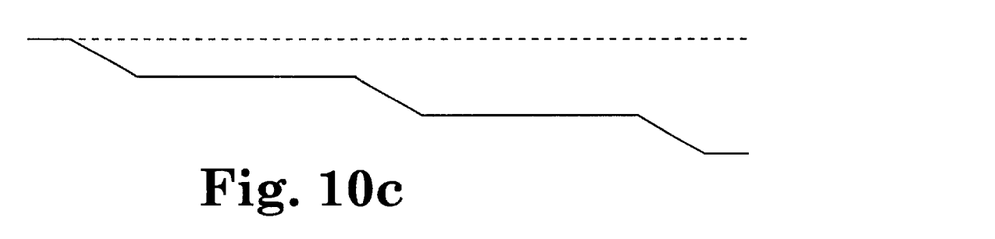
Figure 10D:
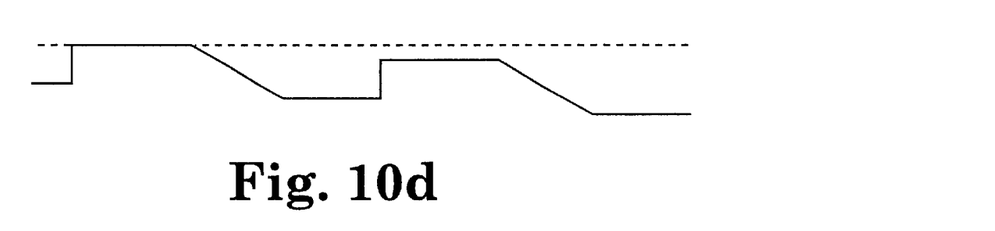
Figure 10E:
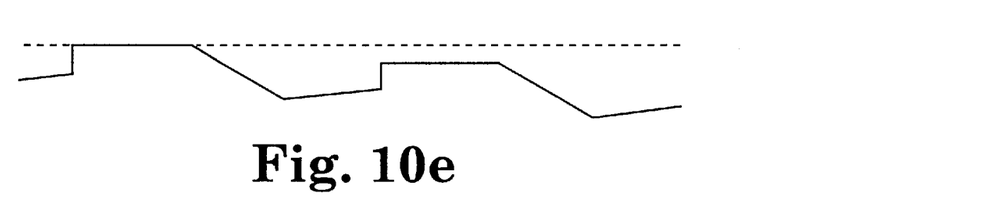

FIG. 9 shows the light path traveled by two light rays 91a and 93a traveling through a backlight 94 of the invention. Light ray 91a strikes land 96 and is reflected towards the distal end (not shown) of backlight 91 as light ray 91b. Light ray 93a strikes facet 95 and is reflected upwards towards display 99 as light ray 93b. If display 99 is suitably modulated, then light wave 93b will pass through display 99 towards a viewer (not shown).

Overall, the light extractor has a wedge-shaped profile. The vertices between the risers and plateaus can if desired lie along a straight line. If the vertices lie along a straight line, and if the light output surface is designated as a reference plane, and if an imaginary straight line is drawn through the vertices between risers and plateaus, then the angle β between the reference plane and the imaginary line preferably is about 0.1 to about 6 degrees, more preferably about 0.4 to about 4 degrees. In one embodiment of the invention having riser-plateau vertices that lie along a straight line, the facet heights are constant along the length of the extractor. In another such embodiment, the facet heights diminish from the input end of the extractor towards the distal or narrow end. In a further embodiment, the facet heights diminish from the input end of the extractor towards the distal or narrow end, the plateau segment lengths are constant along the length of the extractor, and the riser heights diminish from the distal end of the extractor towards the input end by an amount sufficient so that the riser-plateau vertices lie along a straight line.

The vertices between risers and plateaus can if desired lie along a curved path. In one such embodiment, the facet heights diminish from the input end of the extractor towards the distal or narrow end and the land segment lengths remain constant along the length of the extractor. In another such embodiment, the facet heights are constant and the land lengths diminish from the input end of the extractor towards the distal or narrow end. In any event, the angle β for an extractor whose riser plateau vertices lie along a curved path should be approximated by calculating the arctangent of the (difference between the input end and distal end thicknesses of the extractor, divided by the length of the extractor), as shown in the following formula:

$$\beta = \arctan((\text{input end thickness} - \text{distal end thickness})/\text{extractor length}).$$

The individual projections need not all be identical and need not all have the same angular orientation, shape or dimensions. However, for ease of manufacturing, generally it will be preferred to form projections whose riser, plateau and facet segments have the same angular orientation and segment length from projection to projection. The land segments also can if desired be similar to one another in angular orientation and segment lengths. Preferably however the projections are spaced at a relatively coarser pitch near the light input end of the extractor, and at a relatively finer pitch towards the narrowest portion (as in the narrow central isthmus of the point to line converter of FIG. 6) or distal end (as in end opposite the light input end in the extractors of FIGS. 5, 7 and 9) of the extractor. This change in spacing can conveniently be accomplished by progressively decreasing the length of the land segments from the input end to the distal end (or narrowest portion) of the extractor.

Each riser segment preferably is planar although other shapes such as convex or concave shapes can be used if desired. The risers do not ordinarily reflect or transmit light rays from inside the light extractor, and thus can have a less than optically smooth surface. However, care should be taken to avoid excessive riser surface roughness. That will help avoid ghosting and other visual artifacts that may arise due to backscattering of light within the light extractor and consequent weak transmission of backscattered light through the risers. The riser heights $r_h$ preferably are about 0.001 to about 0.5 mm, more preferably about 0.002 to about 0.02 mm. The angle $\rho$ between the reference plane and a riser preferably is about 90 to about 45 degrees, more preferably about 85 to about 65 degrees.

Usually a portion of each plateau segment will lie in the shadow cast by light rays striking the adjoining riser and thus will not participate in light reflection or extraction. In a front light guide construction, the unshadowed portions of the plateaus can serve as upper viewing ports for extracted light. Preferably, the plateaus are planar although they can have other shapes such as convex or concave shapes if desired. Preferably however the plateaus have flat, optically smooth surfaces so as not to induce distortion in the extracted light. The plateau segment lengths preferably are about 0.001 to about 1.5 mm, more preferably about 0.004 to about 0.12 mm. The angle $\theta$ between the reference plane and a plateau preferably is about 0 to about 10 degrees, more preferably about 0 to about 2 degrees, with the plateau segments most preferably being parallel to the reference plane (or in other words, $\theta$ most preferably is zero).

The facet or ramp segments direct light toward the display whereupon it can be extracted (sometimes following one or more further reflections) and suitably modulated by the display. Preferably, the facets are planar although they can have other shapes such as convex or concave shapes if desired. Preferably the facets have flat, optically smooth surfaces so as not to index scattering of the reflected light. The facet heights $f_h$ preferably are greater than the riser heights, and more preferably are about 0.001 to about 1.5 mm, most preferably about 0.002 to about 0.12 mm. The angle $\phi$ between the reference plane and a facet preferably is about 20 to about 50 degrees, more preferably about 25 to about 45 degrees.

The land segments of the light-redirecting surface reflect light by TIR toward the narrow portion or distal end of the extractor. The lands can also serve as a lower viewing port for extracted light. Preferably, the lands are planar although they can have other shapes such as convex or concave shapes if desired. Preferably the lands have flat, optically smooth surfaces so as not to induce scattering of the reflected light. As noted above, the land segments preferably decrease in length along the length of the extractor. A preferred pitch is from about 0.06 to about 12 projections per mm at the light input end to about 250 to about 1 projection per mm at the distal end or narrowest portion of the extractor. A preferred land segment length is about 0.003 to about 15 mm, more preferably about 0.003 to about 1.2 mm. The angle $\gamma$ between the reference plane and a land preferably is about 0 to about 5 degrees, more preferably about 0.5 to about 2 degrees. Most preferably, the lands are tilted in the opposite direction from the wedge. When so tilted, light that comes from the input end of the extractor and strikes the lands will tend subsequently to strike the facets at a higher angle of incidence, thereby increasing extraction efficiency.

The projections can extend across the full width of the light-redirecting surface (as is shown, for example, in FIG. 7) or can be in the form of shorter, less than full width segments, which can be aligned with one another in rows and columns or staggered from row to row. Rows of projections can be arranged in parallel to the light input surface or at an angle with respect to that surface. Preferably, the projections extend across the full width of the light-redirecting surface and are generally parallel to the light input surface.

The light input surface and light output surface can be planar or have a convex or concave curvature. When the light source is a point source, the light input surface preferably has a convex curvature. If the incoming light is not evenly distributed along the width of the input surface, then lenslets, prisms, a roughened surface or other microstructures can be added to the light input surface to more evenly distribute the light. The light output surface preferably has an optically smooth finish, in order to minimize transmission losses, undesired scattering and distortion.

The light extractor can have any desired overall size and thickness but preferably it is as thin as possible, e.g., 5 mm or less at the thickest portion of the extractor. The light extractor can be square, rectangular, oval or any other desired shape when viewed from the intended display observation point. The size and shape of the extractor usually will be dictated by the size and shape of the desired display device and by whether the extractor is intended to function as a point to line, line to area or point to area converter. The light extractors of the invention are particularly useful as point to area or line to area front light guides for subminiature or miniature display devices illuminated with light emitting diodes (LEDs) powered by small batteries. Suitable display devices include color or monochrome LCD devices for cell phones, pagers, personal digital assistants, clocks, watches, calculators, laptop computers, vehicular displays and the like. The display can also be a fixed graphic such as a poster or sign, or a variable-appearance substrate such as "Gyricon" electronic display material (under development by Xerox Corporation). In addition to LEDs, other suitable illumination sources include fluorescent or incandescent lamps, electroluminescent lights and the like.

The light extractors of the invention can be fabricated from a wide variety of optically suitable materials including polycarbonate; polyacrylates such as polymethyl methacrylate; polystyrene and glass, with high refractive index plastics such as polycarbonate being preferred. The light extractors preferably are made by molding, embossing, curing or otherwise forming an injection moldable resin against a lathe-turned tool or other formed surface, made of metal or other durable material that bears a negative replica of the desired structured surface. Methods for making such formed surfaces and for molding, embossing or curing the extractor will be familiar to those skilled in the art. Individual light extractor designs can if desired be evaluated without the need for actual extractor fabrication, by using suitable ray-tracing modeling software such as "ASAP" from Breault Research Organization, Inc., "Code V" and "Light Tools" from Optical Research Associates, "Optica" from Wolfram Research, Inc. and "ZEMAX" from Focus Software, Inc.

The invention is further illustrated in the following non-limiting examples.

EXAMPLES

Two generally planar and three generally wedge-shaped extractors were simulated using CAD software and evaluated using ASAP ray tracing software. This approach gives generally good agreement with observed actual results without the need to mold and fabricate prototypes. Each extractor would be made from 1.58 refractive index polycarbonate plastic. All would have a 30 mm width, 40 mm length, and 1 mm thick input aperture. The distal ends of Extractors 1 and 2 would be 1 mm thick. The distal ends of Extractors 3, 4 and 5 would be 0.2 mm thick. The light sources were assumed to be rectangular, 30 mm long, 1 mm high, and with a Lambertian light distribution.

The general shapes of the steps or projections in Extractors 1 through 5 are shown in FIGS. 10a through 10e, respectively. The dashed lines in FIGS. 10a through 10e are drawn parallel to the reference plane. Extractors 4 and 5 would be extractors of the invention. The angles and dimensions of the segments for each extractor are listed below in Table I. For Extractors 1 through 4, the lands (and plateaus if present) would be horizontal ($\gamma$ is zero). For Extractor 5, the lands would tilt slightly upward at an angle $\gamma$ of 0.75 degrees. For all extractors, the risers (if present) would be tilted at an angle $\rho$ of 90 degrees. The facets in each extractor would be tilted at an angle $\phi$ of 30 degrees.

For Extractors 1 through 3, the riser height and facet height values shown in Table I would apply to the entire extractor. For Extractors 4 and 5, Table I shows the height of the facet nearest the input end of the extractor. The facet heights for Extractors 4 and 5 would decrease from the input end towards the distal end of each extractor. For Extractor 5, Table I shows the height of the riser nearest the distal end of the extractor. The riser heights for Extractor 5 would decrease from the distal end towards the input end of the extractor. These variations in facet or riser height permit the riser-plateau vertices of Extractors 4 and 5 to lie along a straight line.

The pitch between projections was varied for each extractor in order to optimize predicted light output to a display to within about ±10% over the area of the extractor's light output surface. The predicted light extraction efficiency for each extractor was then calculated and recorded.

Extractors 1 and 3 through 5 were assumed to have 200 steps or projections along the length of the extractor. Extractor 2 was assumed to have 400 projections along the length of the extractor. This provided an increase in efficiency compared to Extractor 2, but uniformity of light output decreased and the large number of projections would make Extractor 2 more difficult to manufacture.

As shown in Table I, the extractors of the invention (Extractor 4 and Extractor 5) had a considerably better overall efficiency than extractors without risers (Extractor 1 and Extractor 2). The extractors of the invention also had considerably better overall efficiency than a step-wedge style extractor (Extractor 3). This improved efficiency should help provide significantly increased battery life in a battery-powered display.

Further increases in efficiency may be available via further adjustment of the land tilt angle $\gamma$ but at a potential decrease in overall uniformity of illumination.

Those skilled in the art will perceive that it is undesirable for light to escape through the top of a light guide in the present invention for two reasons. First, any light that escapes from the top of light guide will be lost and not available for illumination of the display. Second, light escaping from the top of the light guide will be visible to the viewer as a generalized glow, thereby reducing the contrast of the display.

Figure 11:
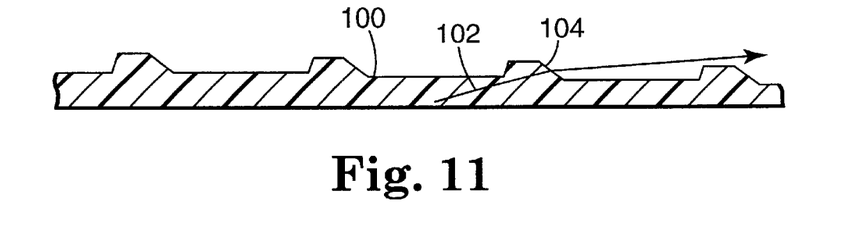
FIG. 11 is a cross sectional view of a light distribution device showing light escaping through the light redirecting surface.

One of the primary sources of light escaping from the top of the light guide is light that is transmitted rather than reflected by the facet that it strikes. An example of this is shown in FIG. 11. Light ray 102 propagates in light guide 100. When it strikes facet 104 it strikes it at an angle less than the critical angle. Therefore most of the light in light ray 102 is transmitted through facet 104 and escapes out of the top of the light guide.

Figure 12:
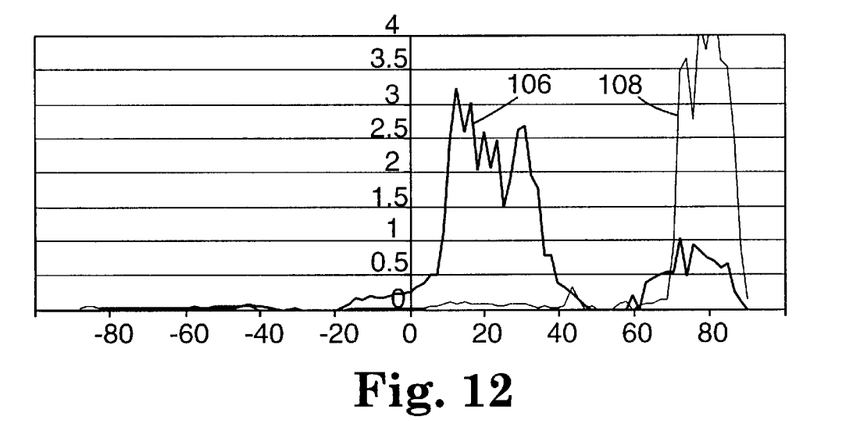
FIG. 12 is a graph showing top and bottom light output for the light distribution device of FIG. 11.

FIG. 12 is a graph, prepared by ray tracing, that shows the light intensities of light escaping from the front and back of a light guide such as light guide 100 as a function of angle. Specifically, curve 106 represents light escaping from the bottom of light guide 100 and curve 108 represents light escaping from the top of light guide 100. FIG. 12 contains data for a light guide having facet angles of 35° measured from the land surface. Although the distributions will change with changing facet angles, the relative intensities will remain largely the same.

Figure 13:
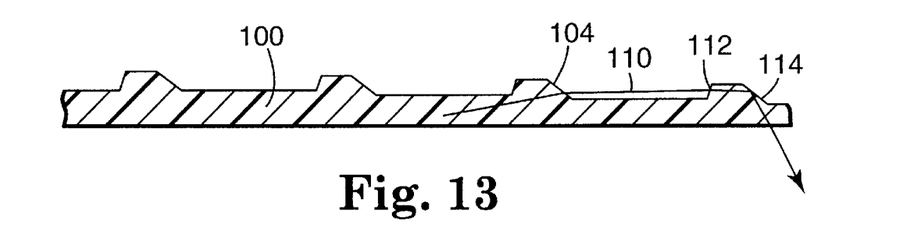
FIG. 13 is a cross-sectional view of a light distribution device showing light being recaptured.

Some of the light that escapes though the facets of the extraction structures on the surface of light guide 100 will reenter light guide 100 through the riser of the adjacent extraction structure. FIG. 13 illustrates this. Light ray 110 propagates in light guide 100 until it strikes facet 104. Since light ray 102 strikes facet 104 at less than the critical angle, most of the light contained in light ray 102 will exit light guide 100 through facet 104. Light ray 110 then proceeds outside light guide 100 until in encounters riser 112 of the adjacent extraction structure. There most of the light contained in light ray 102 will reenter light guide 100. Since light ray 102 refracts when it passes through facet 104 and again when it passes through riser 112, appropriate choices of riser and facet angles will cause light ray 102 to reenter light guide 100 at an angle such that it is more likely to strike riser 114 at an angle greater than the critical angle and be

TABLE I

| Extractor No. | β | γ | ρ | θ | φ | Riser Height, mm | Plateau Length, mm | Facet Height, mm | Total No. of Projections | Starting Pitch, mm | ΔPitch, mm | Minimum Pitch, mm | Extractor Efficiency |
|---|---|---|---|---|---|---|---|---|---|---|---|---|---|
| 1 | 0° | 0° | 90° | 0° | 30° | 0.005 | 0.01768 | 0.005 | 200 | 0.30 | $1.00363 \times 10^{-3}$ | 0.06 | 27% |
| 2 | 0° | 0° | 90° | 0° | 30° | 0.005 | 0.01768 | 0.005 | 400 | 0.175 | $4.151 \times 10^{-4}$ | 0.06 | 42% |
| 3 | 1.45° | 0° | NA | 0° | 30° | NA | NA | 0.004 | 200 | 0.21832 | 0 | 0.21832 | 40% |
| 4 | 1.45° | 0° | 90° | 0° | 30° | 0.005 | 0.01768 | 0.013 | 200 | 0.4 | $2.077855 \times 10^{-3}$ | 0.06 | 56% |
| 5 | 1.45° | 0.75° | 90° | 0° | 30° | 0.0046 | 0.01768 | 0.0138 | 200 | 0.44 | $2.56236 \times 10^{-3}$ | 0.06 | 59% |

Notes:
NA = Not Applicable extracted through the bottom surface of light guide 100 by total internal reflection at riser 114.

Figure 14:
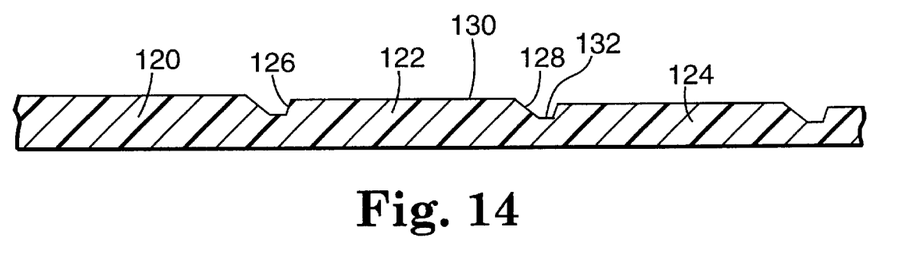
FIG. 14 is a cross-sectional view of an improved light distribution device providing increased light recapture.

It has been discovered that, by increasing the size of the plateaus relative to the size of the lands, it is possible to increase the proportion of the light escaping through the facets that is recaptured by the adjacent risers. FIG. 14 shows a light guide 120 that uses this discovery. Light guide 120 has extraction structures such as extraction structure 122 and extraction structure 124. Extraction structure 122 has a riser 126, a facet 128, and a plateau 130. Land 132 separates extraction structures 122 and 124. Generally it is desirable that the total area of the plateaus on a light guide be greater than the total area of the lands. Alternatively phrased, most of the plateaus should have an area greater than the area of either of the adjacent lands.

Figure 15:
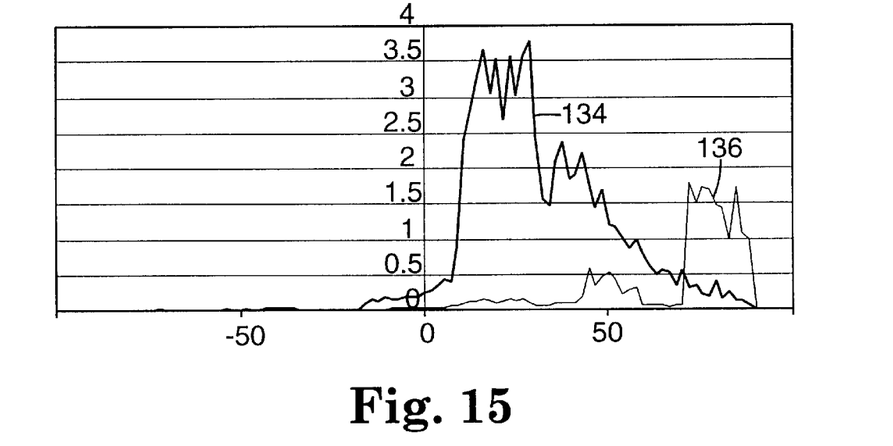
FIG. 15 is a graph showing top and bottom light output for the light distribution device of FIG. 14.

FIG. 15 is a graph, prepared by ray tracing, that shows the light intensities of light escaping from the top and bottom of a light guide such as light guide 120 as a function of angle. Specifically, curve 134 represents light escaping from the back of light guide 120 and curve 136 represents light escaping from the front of light guide 120. FIG. 15 contains data for a light guide having facet angles of 35° measured relative to the land. Although the distributions will change with changing facet angles, as with the data of FIG. 12, the relative intensities will remain largely the same.

Figure 16:
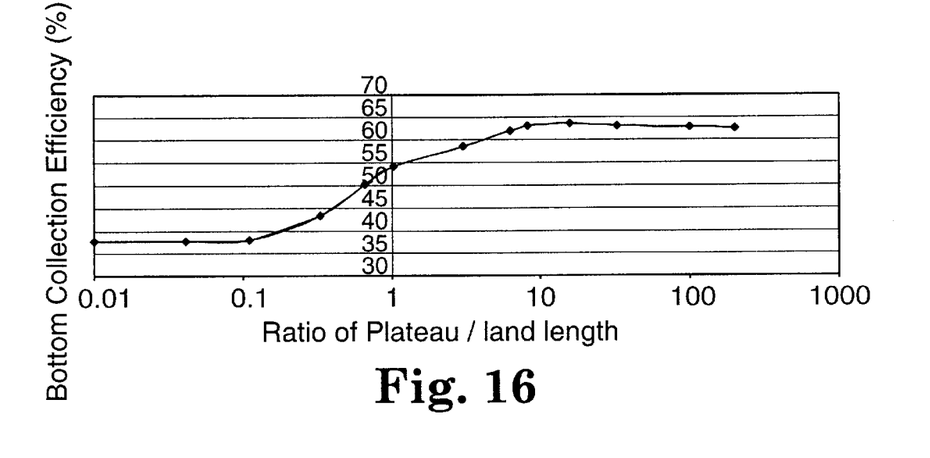
FIG. 16 is a graph showing bottom collector efficiency as a function of plateau to land length.

FIG. 16 is a graph, prepared by ray tracing, of Bottom Collector Efficiency as a function of the ratio of plateau area to land area. Bottom Collector Efficiency is defined as the integrated amount of light escaping out of the bottom of the light guide divided by the amount of light inserted through the input surface. As may be seen from the graph, when the plateau-land ratio goes below 0.1, the Bottom Collector Efficiency levels out and remains constant at a low level. As the plateau-land ratio rises above 0.1 the Bottom Collector Efficiency rises until the ratio reaches about 8 after which the Bottom Collector Efficiency again becomes constant at a relatively high level. In view of this relationship, the data of FIG. 12 were calculated for a light guide having a plateau-land ratio of less than 0.1 and the data of FIG. 15 were calculated for a light guide with a plateau-land ratio of greater than 8.

Figure 17:
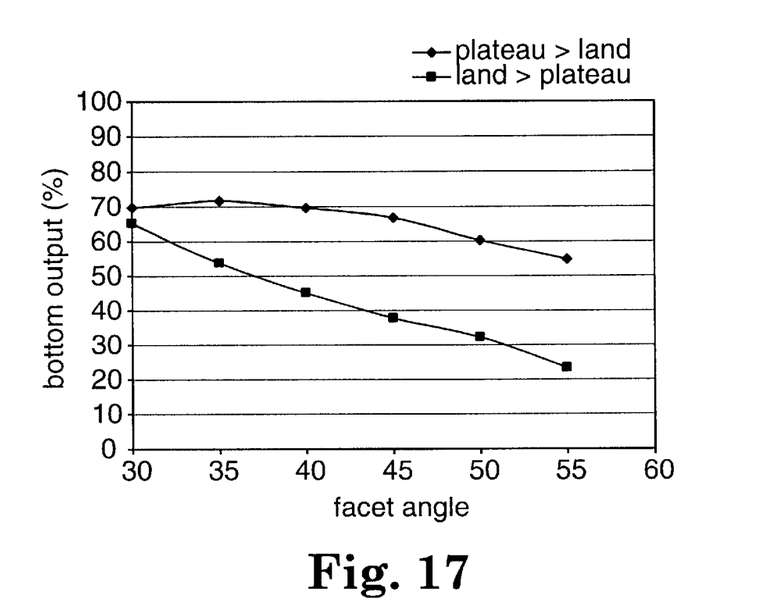
FIG. 17 is a graph showing bottom collector efficiency as a function of facet angle.

As mentioned previously, the facet angle will affect the output of the light guide. Another advantage of increasing the plateau-land ratio is that the facet angle dependence is reduced. This is shown in FIG. 17 which is a graph, prepared by ray tracing, of Bottom Collector Efficiency as a function of facet angle for a light guide having a plateau-land ratio of 220 and one having a plateau-land ratio of 0.07. As may be seen, the Bottom Collector Efficiency falls off rapidly with increasing facet angles for the light guide having the lower plateau-land ratio while it remains relatively constant over a wide range of facet angles for the light guide having the greater plateau-land ratio. This is important since structures with greater facet angles are generally easier to mold.

Figure 18:
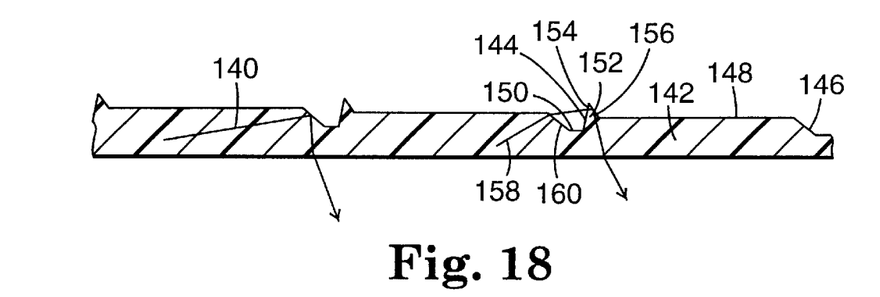
FIG. 18 is a cross-sectional view of another light distribution device providing increased light recapture.

FIG. 18 shows another improvement that further increases the efficiency of a light guide according to the present invention. In the embodiment of FIG. 18, a light guide 10 has extraction structures such as extraction structure 142. Extraction structure 142 has a riser 144, a facet 146, and a plateau 148. Adjacent extraction structures are separated by lands such as land 150. Additionally, extraction structure 142 has a protrusion 152 on the same side as riser 144. Protrusion 152 has a riser 154 and a facet 156. Light ray 158 strikes facet 160 at an angle less than the critical angle and thus is transmitted out of light guide 140. It then strikes riser 154 of protrusion 152 and reenters light guide 14. Light ray 158 will then strike facet 156 at an angle greater than the critical angle and undergo total internal reflection and emerge from the bottom of the light guide. Thus light that would have missed the riser and have been emitted on the top of light guide 140 absent protrusion 152 is redirected to the desired direction. Typically, refraction at facet 158 and riser 154 will redirect light ray 158 sufficiently to cause it to undergo total internal reflection at facet 156, but the facet angle of facet 156 may be adjusted to enhance this effect. Preferably, the risers of protrusions such as protrusion 152 should have a height of least ten percent of the height of the riser of associated extraction structure. Although there is no limit on the maximum height of the riser of a protrusion, the practical limit is approximately one hundred percent of the height of the riser of associated extraction structure.

Those of skill in the art will recognize that protrusions such as protrusion 152 may be used with either high or low plateau-land ratios, but the combination of such protrusions and high plateau-land ratios will generally provide the greatest efficiencies. Optical modeling indicates that the addition of the riser will raise the efficiency of a high plateau-land ratio light guide from about 63% to over 80%.

Figure 19:
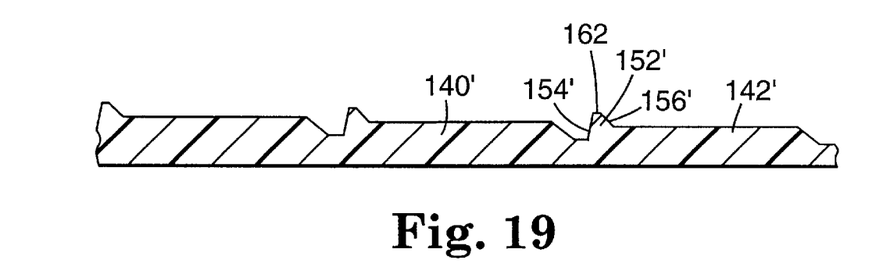
FIG. 19 is a cross-sectional view of an alternative design to that shown in FIG. 18.

FIG. 19 shows a slight variation on the embodiment of FIG. 18. In the embodiment of FIG. 19, a light guide 140' has an extraction structure 142'. Extraction structure 142' has a protrusion 152' which has a riser 154' and a facet 156'. Protrusion 152' further has a plateau 162. Providing the protrusion with a plateau will improve the mechanical integrity of the light guide, but such a plateau should be kept as small as possible to prevent distortion of the display when it is viewed through the light guide when used in front light applications.

Figure 20:
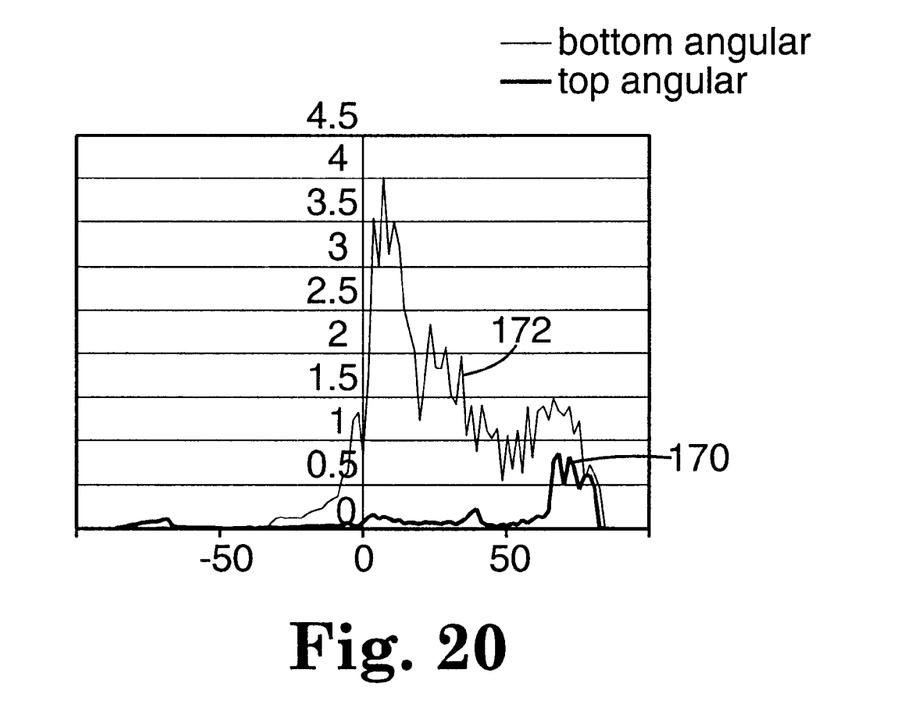
FIG. 20 is a graph showing the top and bottom light output for the light distribution devices of FIGS. 19 and 20.

FIG. 20 is a graph, prepared by ray tracing, that shows the top and bottom light output intensities, 170 and 172, respectively, of a light guide having plateau-land ratio of 100 and protrusions having riser heights of 0.4 of the height of main riser heights. As may be seen, the protrusions provide a further improvement over the high plateau-land ratio light guide for which the performance data is shown in FIG. 15.

The present invention has been described in terms of a front light. Those of skill in the art will understand that the same design could be used in a back light for use with a transmissive or transflective LCD. If a light guide according to the present invention is used in a back light all of the forgoing description is accurate except that, to be consistent with the common terminology in backlights, all references to top and bottom should be reversed. If the present invention is used as a front light, it would typically be used with a reflective display such as a reflective liquid crystal display. If it is used as a back light, it would typically be used with a transmissive display such as a transmissive liquid crystal display. Finally, the present invention could be used as either a front light or a back light with a transflective display such as a transflective liquid crystal.

Various modifications and alterations of this invention will be apparent to those skilled in the art without departing from the scope and spirit of this invention. It should be understood that this invention is not limited to the illustrative embodiments set forth above.

What is claimed is:

1. A light distribution device having:
   a) a light input end;
   b) a light output surface that can deliver light to a display; and
   c) a structured light-redirecting surface located generally opposite the light output surface;

wherein the light-redirecting surface reflects light towards the light output surface and thence to the display and the light-redirecting surface comprises a plurality of light extraction structures comprising a riser segment, plateau segment, and facet segment and adjacent light extraction structures are separated by lands, the total area of said plateaus exceeding the total area of said lands, and the lands being at an angle γ of about 0 to about 5 degrees to a reference plane formed by or closely approximating the light output surface.

2. A light distribution device having:
a) a light input end;
b) a light output surface that can deliver light to a display; and
c) a structured light-redirecting surface located generally opposite the light output surface;
wherein the light-redirecting surface reflects light towards the light output surface and thence to the display and the light-redirecting surface comprises a plurality of light extraction structures comprising a riser segment, plateau segment, and facet segment and adjacent light extraction structures are separated by lands, wherein the total area of said plateaus is at least eight times the total area of said lands.

3. A light distribution device having:
a) a light input end;
b) a light output surface that can deliver light to a display; and
c) a structured light-redirecting surface located generally opposite the light output surface;
wherein the light-redirecting surface reflects light towards the light output surface and thence to the display and the light-redirecting surface comprises a plurality of light extraction structures comprising a riser segment, plateau segment, and facet segment and adjacent light extraction structures are separated by lands, the total area of said plateaus exceeding the total area of said lands, wherein at least some of said light extraction structures further include a protrusion having a riser segment and a facet segment.

4. A light distribution device according to claim 3 wherein said protrusions include plateau segments.

5. A light distribution device according to claim 3 wherein the total area of said plateaus is at least eight times the total area of said lands.

6. A light distribution device according to claim 3 wherein said riser segment of said protrusion has a height of at least ten percent of the height of said riser segment of said light extraction structure.

7. A light distribution device having:
a) a light input end;
b) a light output surface that can deliver light to a display; and
c) a structured light-redirecting surface located generally opposite the light output surface;
wherein the light-redirecting surface reflects light towards the light output surface and thence to the display and the light-redirecting surface comprises a plurality of light extraction structures comprising a riser segment, plateau segment, and facet segment and adjacent light extraction structures are separated by lands, the total area of said plateaus exceeding the total area of said lands, wherein at least some of said light extraction structures further include a protrusion having a riser segment and a facet segment; said riser segment of said protrusion has a height of at least ten percent of the height of said riser segment of said light extraction structure; and the total area of said plateaus is at least eight times the total area of said lands.

8. A light distribution device having:
a) a light input end;
b) a light output surface that can deliver light to a display; and
c) a structured light-redirecting surface located generally opposite the light output surface;
wherein the light-redirecting surface reflects light towards the light output surface and thence to the display and the light-redirecting surface comprises a plurality of light extraction structures comprising a riser segment, plateau segment, and facet segment and adjacent light extraction structures are separated by lands and at least some of said light extraction structures further include a protrusion having a riser segment and a facet segment.

9. A light distribution device according to claim 8 wherein said protrusions include plateau segments.

10. A light distribution device according to claim 8 wherein said riser segments of said protrusions have heights of at least ten percent of the heights of said riser segments of said extraction structures.

11. A light distribution device according to claim 9 wherein said protrusions include plateau segments.

12. A display device comprising a display and a light distribution device adjacent said display said light distribution device having:
a) a light input end;
b) a light output surface that can deliver light to a display; and
c) a structured light-redirecting surface located generally opposite the light output surface;
wherein the light-redirecting surface reflects light towards the light output surface and thence to the display and the light-redirecting surface comprises a plurality of light extraction structures comprising a riser segment, plateau segment, and facet segment and adjacent light extraction structures are separated by lands, the total area of said plateaus exceeding the total area of said lands, and the lands being at an angle γ of about 0 to about 5 degrees to a reference plane formed by or closely approximating the light output surface.

13. A display device according to claim 12 wherein said display is a reflective display.

14. A display device according to claim 12 wherein said display is a reflective liquid crystal display.

15. A display device comprising a transmissive display and a light distribution device adjacent said display said light distribution device having:
a) a light input end;
b) a light output surface that can deliver light to a display; and
c) a structured light-redirecting surface located generally opposite the light output surface;
wherein the light-redirecting surface reflects light towards the light output surface and thence to the display and the light-redirecting surface comprises a plurality of light extraction structures comprising a riser segment, plateau segment, and facet segment and adjacent light extraction structures are separated by lands, the total area of said plateaus exceeding the total area of said lands.

16. A display device according to claim 15 wherein said display is a transmissive liquid crystal display.

17. A display device according to claim 12 wherein said display is a transflective display.

18. A display according to claim 17 wherein said display is a transflective liquid crystal display.

19. A display device comprising a display and a light distribution device adjacent said display said light distribution device having:

a) a light input end;

b) a light output surface that can deliver light to a display; and c) a structured light-redirecting surface located generally opposite the light output surface;

wherein the light-redirecting surface reflects light towards the light output surface and thence to the display and the light-redirecting surface comprises a plurality of light extraction structures comprising a riser segment, plateau segment, and facet segment and adjacent light extraction structures are separated by lands, wherein the total area of said plateaus is at least eight times the total area of said lands.

20. A display device comprising a display and a light distribution device adjacent said display said light distribution device having:

a) a light input end;

b) a light output surface that can deliver light to a display; and c) a structured light-redirecting surface located generally opposite the light output surface;

wherein the light-redirecting surface reflects light towards the light output surface and thence to the display and the light-redirecting surface comprises a plurality of light extraction structures comprising a riser segment, plateau segment, and facet segment and adjacent light extraction structures are separated by lands, the total area of said plateaus exceeding the total area of said lands, wherein at least some of said light extraction structures further include a protrusion having a riser segment and a facet segment.

21. A light distribution device according to claim 20 wherein said protrusions include plateau segments.

22. A light distribution device according to claim 20 wherein said riser segments of said protrusions have heights of at least ten percent of the heights of said riser segments of said extraction structures.

23. A display device according to claim 20 wherein the total area of said plateaus is at least eight times the total area of said lands.

24. A display device according to claim 20 wherein said riser segment of said protrusion has a height of at least ten percent of the height of said riser segment of said light extraction structure.

25. A display device according to claim 24 wherein the total area of said plateaus is at least eight times the total area of said lands.

26. A display device comprising a display and a light distribution device adjacent said display said light distribution device having:

a) a light input end;

b) a light output surface that can deliver light to a display; and c) a structured light-redirecting surface located generally opposite the light output surface;

wherein the light-redirecting surface reflects light towards the light output surface and thence to the display and the light-redirecting surface comprises a plurality of light extraction structures comprising a riser segment, plateau segment, and facet segment and adjacent light extraction structures are separated by lands and at least some of said light extraction structures further include a protrusion having a riser segment and a facet segment.

27. A display device according to claim 26 wherein said display is a reflective display.

28. A display device according to claim 27 wherein said display is a reflective liquid crystal display.

29. A display device according to claim 26 wherein said display is a transmissive display.

30. A display device according to claim 29 wherein said display is a transmissive liquid crystal display.

31. A display device according to claim 26 wherein said display is a transflective display.

32. A display according to claim 26 wherein said display is a transflective liquid crystal display.

33. A display device according to claim 26 wherein said riser segment of said protrusion has a height of at least ten percent of the height of said riser segment of said light extraction structure.

34. A light distribution device according to claim 26 wherein said protrusions include plateau segments.

35. A light distribution device according to claim 34 wherein said riser segments of said protrusions have heights of at least ten percent of the heights of said riser segments of said extraction structures.

36. A light distribution device having:

a) a light input end;

b) a light output surface that can deliver light to a display; and c) a structured light-redirecting surface located generally opposite the light output surface;

wherein the light-redirecting surface reflects light towards the light output surface and thence to the display and the light-redirecting surface comprises a plurality of light extraction structures comprising a riser segment, plateau segment, and facet segment and adjacent light extraction structures are separated by lands, a majority of said extraction structures having plateaus that are larger than the adjacent lands, and the lands being at an angle γ of about 0 to about 5 degrees to a reference plane formed by or closely approximating the light output surface.

* * * * *